United States Patent Office 2,862,363
Patented Dec. 2, 1958

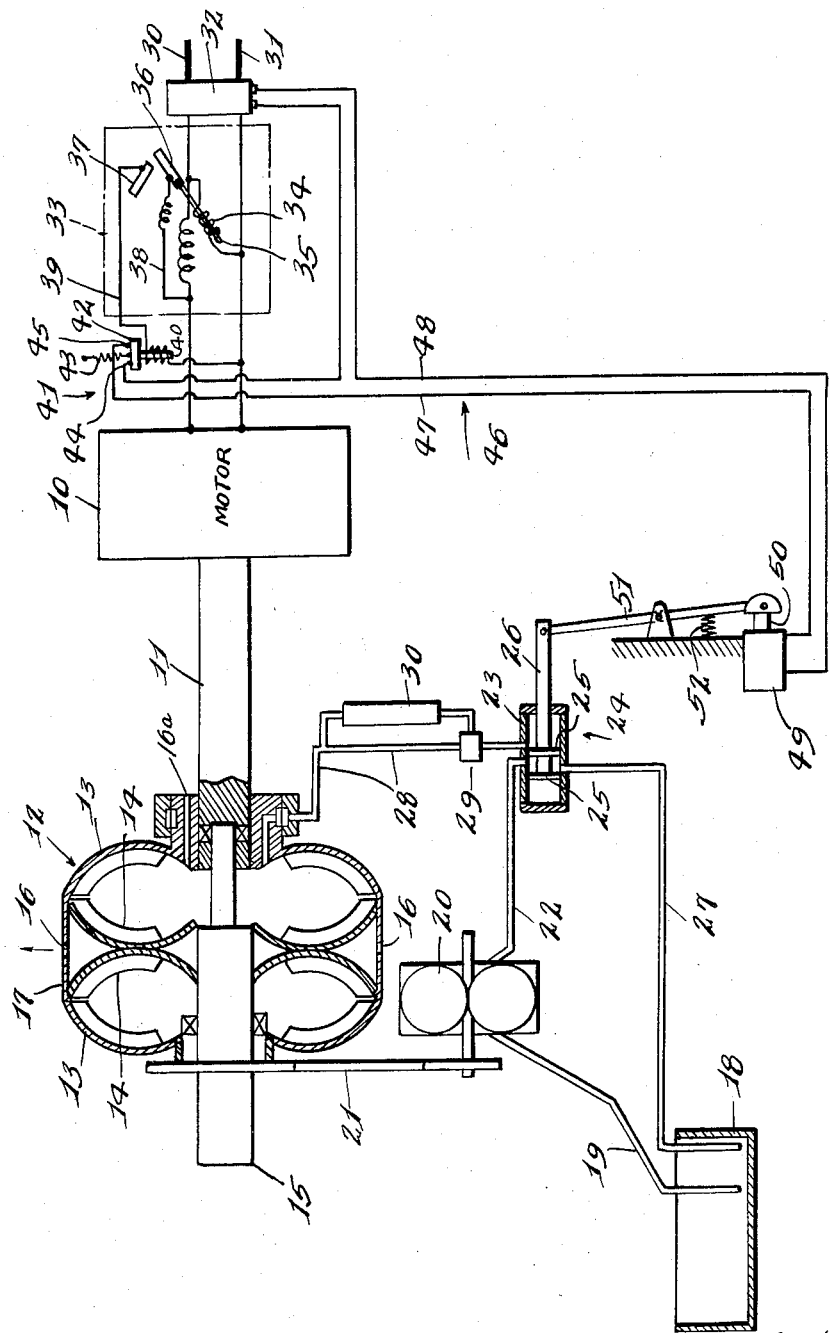

2,862,363

POWER TRANSMISSION

James B. Black, Rockford, and Wilbur F. Shurts, Winnebago, Ill., assignors to Twin Disc Clutch Company, Racine, Wis., a corporation of Wisconsin Application January 17, 1956, Serial No. 559,571

5 Claims. (Cl. 60—54)

Our invention relates to a power transmission and more particularly to an arrangement in which a hydraulic coupling is directly connected to a load and in which a limiting control is exercised on the fill of the coupling during the starting period under load.

While capable of general application in situations where it is desirable to limit the full starting torque through the coupling, the invention will, by way of example, be described in connection with a conveyor belt directly connected through a hydraulic coupling to an electric motor. These drives are frequently started under full load and there is a serious problem of preventing the application of the full starting torque of the motor to the belt in the interest of securing an adequate belt life. At present, common solution involves the use of a wound rotor, induction motor in conjunction with a special type of starting equipment that will satisfy the torque limitations during starting, but this power connection, by comparison with that disclosed herein, is relatively complex and costly.

The present invention is based on known characteristics of a hydraulic coupling, namely, that, for any given speed relationship between the impeller and runner, the torque transmitted is a function of the fill of the coupling, and, further that, at high slips or relatively slow runner speeds at constant fill and input speed, the torque transmitting capacity may increase with decreasing slip while at low slip the reverse is true.

It is therefore the principal object of our invention to provide a power transmission including a hydraulic coupling in which a power sensing device limits the torque transmitted through the coupling during the starting period by limiting the fill thereof while permitting maximum running torque transmission with the coupling filled when the load attains its rated speed.

The drawing schematically illustrates the transmission and the electrical components including the power sensing device.

Referring to the drawing, the numeral 10 designates a standard induction motor of the squirrel cage type whose drive shaft 11 connects with a conventional, twin circuit, hydraulic coupling 12 having axially spaced, facing impellers 13—13 between which are located in the usual manner oppositely facing runners 14—14 which connect with an output shaft 15 suitably attached to a load (not shown).

The coupling is of the type wherein the working oil during normal operation, i. e., after the load has attained rated speed, is continuously pumped thereto and continuously discharged therefrom into a sump through a plurality of bleed holes 16 circumferentially spaced around a ring 17 that connects the periphery of the impellers 13—13 and other holes 16ª around the coupling hub. During the starting phase, the oil is pumped into the then empty or nearly empty coupling until the power absorption in the coupling reaches a value at which the power sensing device effects a bypass of the pump delivery to the sump until sufficient oil has been bled from the coupling to restore pumping thereto.

Specifically, the numeral 18 designates the sump which is operably related to the coupling so that oil bled through the holes 16 and 16ª will flow to the sump. From the latter, a pipe 19 leads to the intake side of a pump 20 which is driven by the impeller 13 through a sprocket-chain connector 21, or generally from the drive to the coupling 12 in such a way that the pump begins operating coincident with the starting of the motor 10.

The discharge side of the pump 20 connects through a pipe 22 with a valve casing 23 forming part of a control valve 24 and within the casing is reciprocable connected and spaced pistons 25—25 carried on a stem 26 which extends outwardly of the casing. Pipes 27 and 28 also connect the valve casing 23, respectively, with the sump 18 and the interior of the coupling 12, it being understood that the showing in the latter respect is diagrammatic only and would be made in conventional manner in view of the rotary movement of the impeller 13. A bypass thermostat 29 may be included in the pipe 28 for directing the oil through a cooler 30 before entering the coupling whenever the working oil requires cooling.

The motor 10 connects with a power circuit through line wires 30 and 31 and a conventional starter 32 which determines the starting and stopping of the motor in the usual way. Located between the motor 10 and starter 32 and related to the line wires 30 and 31 in the well known manner is a wattmeter 33 of the contact making type whose movable coil 34 carries a needle 35 provided with a movable contact 36 suitably insulated therefrom and which is arranged to sweep over a fixed contact strip 37 during a part of its movement. A wire 38 connects the movable contact 36 with the line wire 30, while a wire 39 connects the contact strip 37 with the line wire 31. The wire 39 includes a coil 40 forming part of a relay 41 whose armature 42 is biased by a spring 43 into contact with terminals 44 and 45 which form part of a solenoid circuit 46.

The latter includes wires 47 and 48 suitably connected with the starter 32 and which respectively connect the terminals 44 and 45 with a solenoid 49 whose core is pivotally connected with one end of a lever 51. This lever is intermediately fulcrumed and its opposite end pivotally connects with the stem 26. When the solenoid 49 is not energized, a spring 52 biases the lever 51 so that the valve 24 occupies the bypass position shown, i. e., with the pistons 25—25 located so that the pipes 22 and 27 are in communication. Therefore, if the pump 20 is then operating, all discharge thereof flows to the sump 18.

In describing the operation of the transmission, it will be assumed first that the output shaft 15 is connected to a load and that the starter 32 is open so that the motor 10 is at rest, the relay 41 is closed under the bias of the spring 43, the solenoid 49 is not energized, and the control valve 24 is as shown which is a bypass position. At this time, the coupling 12 is also at rest and is either empty or substantially so depending upon the position of the lowermost bleed holes 16. Further, the movable contact 36 is in the retracted position shown and which is clear of the fixed contact 37 as determined by the absence of current through the wattmeter 33, the needle 35 being in the zero position under the conventional spring bias (not shown).

To begin operation, the starter 32 is closed so that the motor 10, impellers 13—13 and pump 20 are brought up quickly to normal speed and the solenoid 49 is energized. The control valve 24 is accordingly shifted to deny flow through the pipe 27 and to connect the pipes 22 and 28 so the pump 20 begins delivering working oil to the coupling 12.

As filling proceeds, its torque transmitting capacity and the power absorbed therein increases. Hence, the movable coil 34 of the wattmeter 33 begins turning in the characteristic manner to effect a movement of the movable contact 36. When sufficient oil has been pumped into the coupling 12 to provide enough torque therethrough to overcome the inertia of the then stationary load, a loaded conveyor belt under the assumed conditions, this belt begins moving and accelerates as the coupling continues to fill. During this period, oil is being continuously discharged through the bleed holes 16.

The torque transmitted by and the power absorbed in the coupling 12 increases with continued filling thereof until the movable contact 36 moves into engagement with the fixed contact strip 37 and, at this point, the relay coil 40 is energized and the solenoid 49 is deenergized to thereby return the control valve 24 to the bypass position shown. This cutoff serves to limit the torque applied to the belt during starting and acceleration substantially below that which would obtain if the motor were directly connected to the load, or if the coupling were completely filled at the start.

Since the coupling is not then being supplied with oil, the torque through the coupling decreases as oil is discharged through the bleed holes 16 and the wattmeter movable coil 34 turns in the opposite direction to release the contacts 36 and 37 and restore the control valve 24 to coupling supply position. Filling of the coupling 12 is renewed and the conveyor belt continues to accelerate, an important difference being that when this second coupling supply is begun, the conveyor belt is already moving.

The above cycles are repeated, i. e., oil supply and non-oil supply to the coupling 12, until the conveyor belt or generally the load is brought up to its rated speed when the torque will be normal, the coupling 12 filled and the pump 20 continuously supplying oil to the coupling with constant discharge through the bleed holes 16 and 16ᵃ.

The wattmeter 33 acts as a power sensing device which through the elements noted above prevents the application of more than a predetermined amount of torque to the load during the starting period. A normal, squirrel cage motor has a pull-out torque of at least twice its normal running torque, but with the arrangement outlined, it is possible to materially limit the load imposed on the motor when starting until the load attains its rated speed. This possibility is important where the load is a conveyor belt since the maximum practical strain on the belt is limited. The torque limitation may be reflected in any desired numerical value depending upon operating conditions and in one installation was restricted to 130% of full load torque.

We claim:

1. A power transmission comprising an electric motor, a rotary hydraulic coupling having its input connected to the motor and its output connectible to a load and including apertures for exterially discharging the working liquid whereby the coupling is substantially empty when at rest, working liquid circuit means including a sump, a pump operable with the coupling input and a control valve shiftable between positions connecting the pump outlet to the sump and coupling, respectively, and biased to a sump connecting position, first electric circuit means arranged to normally shift the valve to coupling supply position when the motor is running, and means for limiting the fill of the coupling during the starting period of the load from rest to rated speed including electric power sensing means responsive to the power demand of the motor, and a second electric circuit energized by a predetermined response of the sensing means and arranged to open the first circuit means to thereby return the valve to sump connecting position.

2. A power transmission comprising an electric motor, a rotary hydraulic coupling having its input connected to the motor and its output connectible to a load and including apertures for exterially discharging the working liquid whereby the coupling is substantially empty when at rest, working liquid circuit means including a sump, a pump operable with the coupling input and a control valve shiftable between positions connecting the pump outlet to the sump and coupling, respectively, and biased to a sump connecting position, means arranged to normally shift the valve to coupling supply position when the motor is running, and means for limiting the fill of the coupling during the starting period of the load from rest to rated speed including electric power sensing means responsive to the power demand of the motor, and means triggered by a predetermined response of the sensing means for conditioning the normal shift means to effect a return of the valve to sump connecting position.

3. A power transmission comprising an electric motor, power wires for the motor, a rotary hydraulic coupling having its input connected to the motor and its output connectible to a load and including apertures for exterially discharging the working liquid whereby the coupling is substantially empty when at rest, working liquid circuit means including a sump, a pump operable with the coupling input and a control valve shiftable between positions connecting the pump outlet to the sump and coupling, respectively, and biased to a sump connecting position, first electric circuit means arranged to normally shift the valve to coupling supply position when the motor is running, and means for limiting the fill of the coupling during the starting period of the load from rest to rated speed including a wattmeter connected to the power wires and having its movable coil bridged therebetween and a second electric circuit energized by a predetermined response of the wattmeter and arranged to open the first electric circuit means to thereby return the valve to sump connecting position.

4. A power transmission as defined in claim 1 wherein the second electric circuit includes relay means having a switch member adapted to form part of the first electric circuit.

5. A power ttransmission as defined in claim 3 wherein the second electric circuit includes relay means having a switch member adapted to form part of the first electric circuit.

References Cited in the file of this patent

UNITED STATES PATENTS

| 1,855,032 | Sinclair | Apr. 19, 1932 |
| 2,223,715 | Berger | Dec. 3, 1940 |